US012598159B2

(12) United States Patent
Anantharaman et al.

(10) Patent No.: US 12,598,159 B2
(45) Date of Patent: Apr. 7, 2026

(54) SUPPLEMENTAL DNAT FOR COMMUNICATION WITHIN OVERLAPPING IP ADDRESS SPACE IN A PRIVATE NETWORK

(71) Applicant: Microsoft Technology Licensing, LLC, Redmond, WA (US)

(72) Inventors: Varun Kalyan Anantharaman, Milpitas, CA (US); Gopikrishna Kannan, Redmond, WA (US); Jashwanth Reddy Gangula, San Jose, CA (US); Suma Venkata Amara, Cupertino, CA (US); Girish Manoharlal Motwani, Pleasanton, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 31 days.

(21) Appl. No.: 18/828,403

(22) Filed: Sep. 9, 2024

(65) Prior Publication Data

US 2025/0373581 A1 Dec. 4, 2025

Related U.S. Application Data

(60) Provisional application No. 63/652,878, filed on May 29, 2024.

(51) Int. Cl.
*H04L 9/40* (2022.01)
(52) U.S. Cl.
CPC ................................. *H04L 63/0236* (2013.01)

(58) Field of Classification Search
CPC .................................................. H04L 63/0236
See application file for complete search history.

(56) References Cited

U.S. PATENT DOCUMENTS

| | | | |
|---|---|---|---|
| 2004/0103321 A1* | 5/2004 | Wesinger, Jr. ...... | H04L 63/0227 707/E17.116 |
| 2007/0282981 A1* | 12/2007 | Cohen ..................... | H04L 43/50 709/221 |
| 2014/0282817 A1* | 9/2014 | Singer .................... | H04L 63/08 726/1 |
| 2018/0041470 A1* | 2/2018 | Schultz .................. | H04L 47/24 |

(Continued)

OTHER PUBLICATIONS

Audet, et al., "Network Address Translation (NAT) Behavioral Requirements for Unicast UDP", NAT UDP Unicast Requirements, RFC 4787, Jan. 2007, 29 pages.

(Continued)

*Primary Examiner* — El Hadji M Sall
(74) *Attorney, Agent, or Firm* — Holzer Patel Drennan

(57) ABSTRACT

A system may receive, at a firewall, a data packet destined to a conflicting private IP address of the first private subnetwork and the second private subnetwork within the private network, the data packet including a destination IP address identifying the firewall. The system may evaluate, at the firewall, the data packet to determine whether a source IP address of the data packet satisfies a routing condition corresponding to a routing rule. The system may apply, at the firewall, the routing rule to determine a translated destination IP address of the first private subnetwork. The system may send the data packet to the first private subnetwork.

20 Claims, 8 Drawing Sheets

(56)          References Cited

U.S. PATENT DOCUMENTS

2018/0191677 A1 *   7/2018  Roychoudhury ... H04L 61/5046

OTHER PUBLICATIONS

Extended European Search Report received for EP Application No. 25177537.5, mailed on Sep. 16, 2025, 09 pages.
Guha, et al., "NAT Behavioral Requirements for TCP", NAT TCP Requirements, RFC 5382, Oct. 2008, 21 pages.
Srisuresh, et al., "IP Network Address Translator (NAT) Terminology and Considerations", NAT Terminology and Considerations, RFC 2663, Aug. 1999, 31 pages.

* cited by examiner

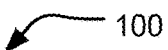
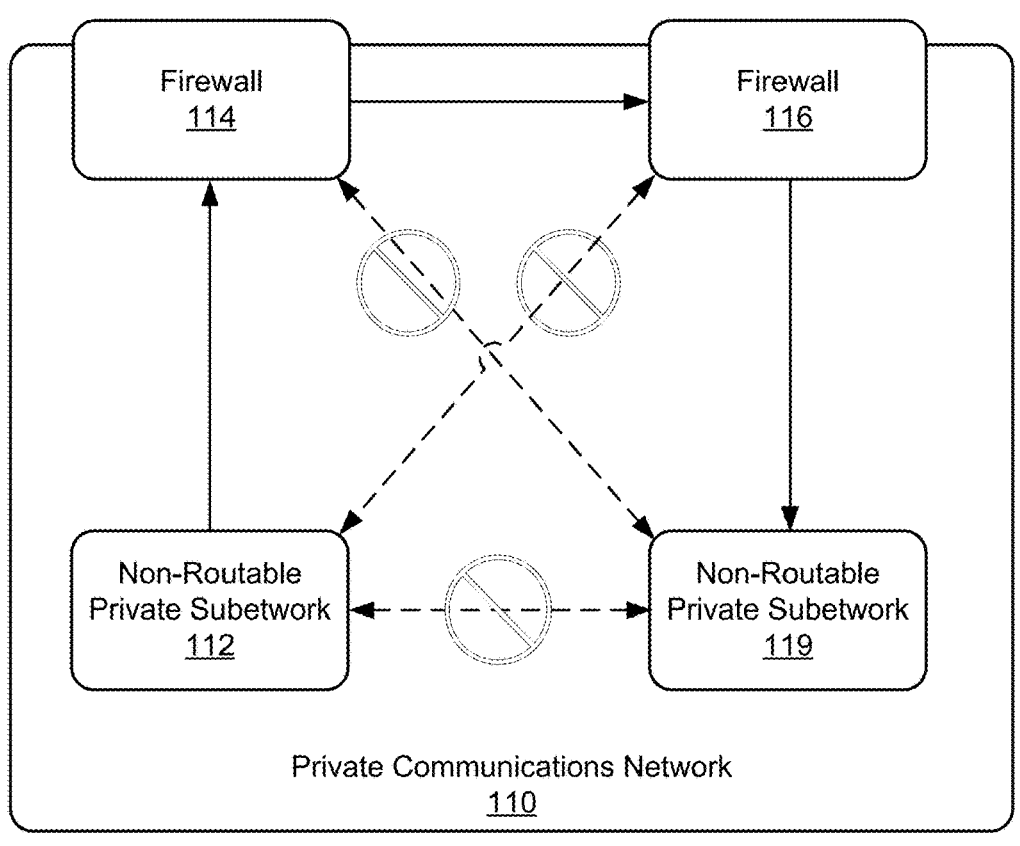
FIG. 1

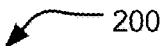
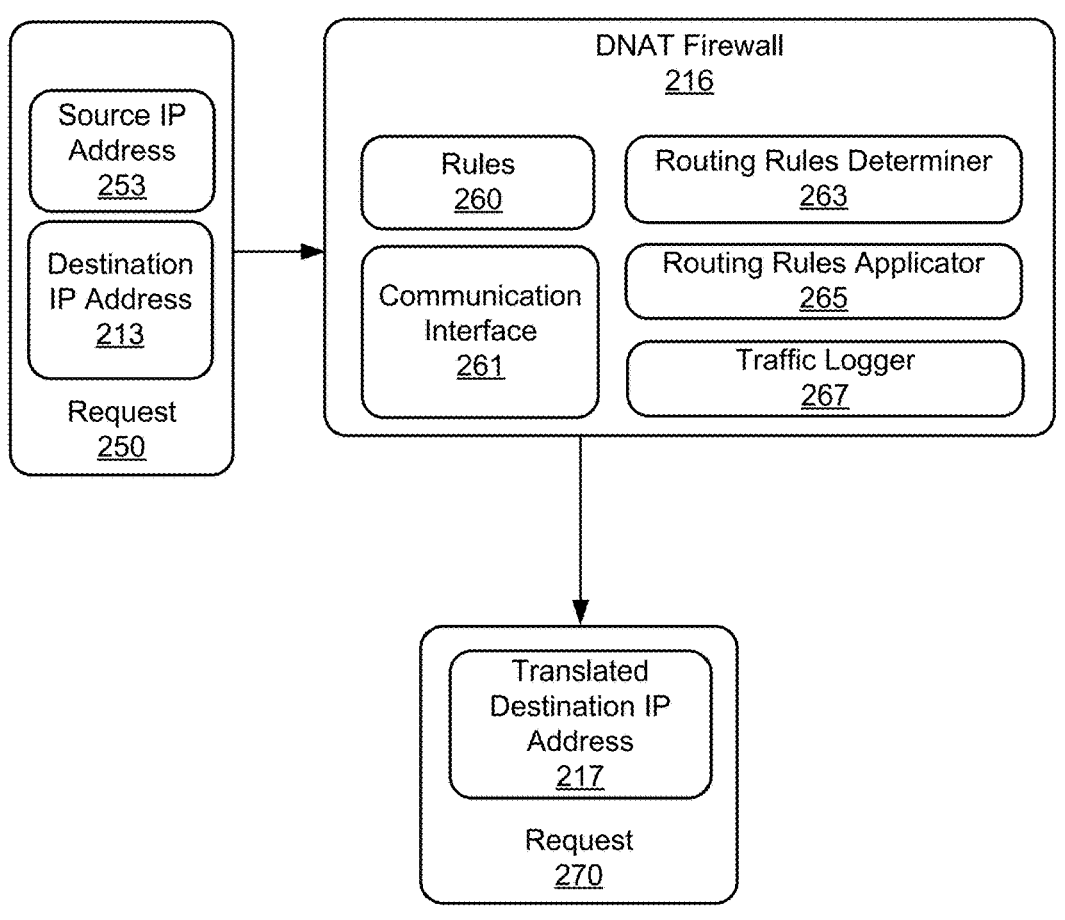
FIG. 2

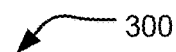
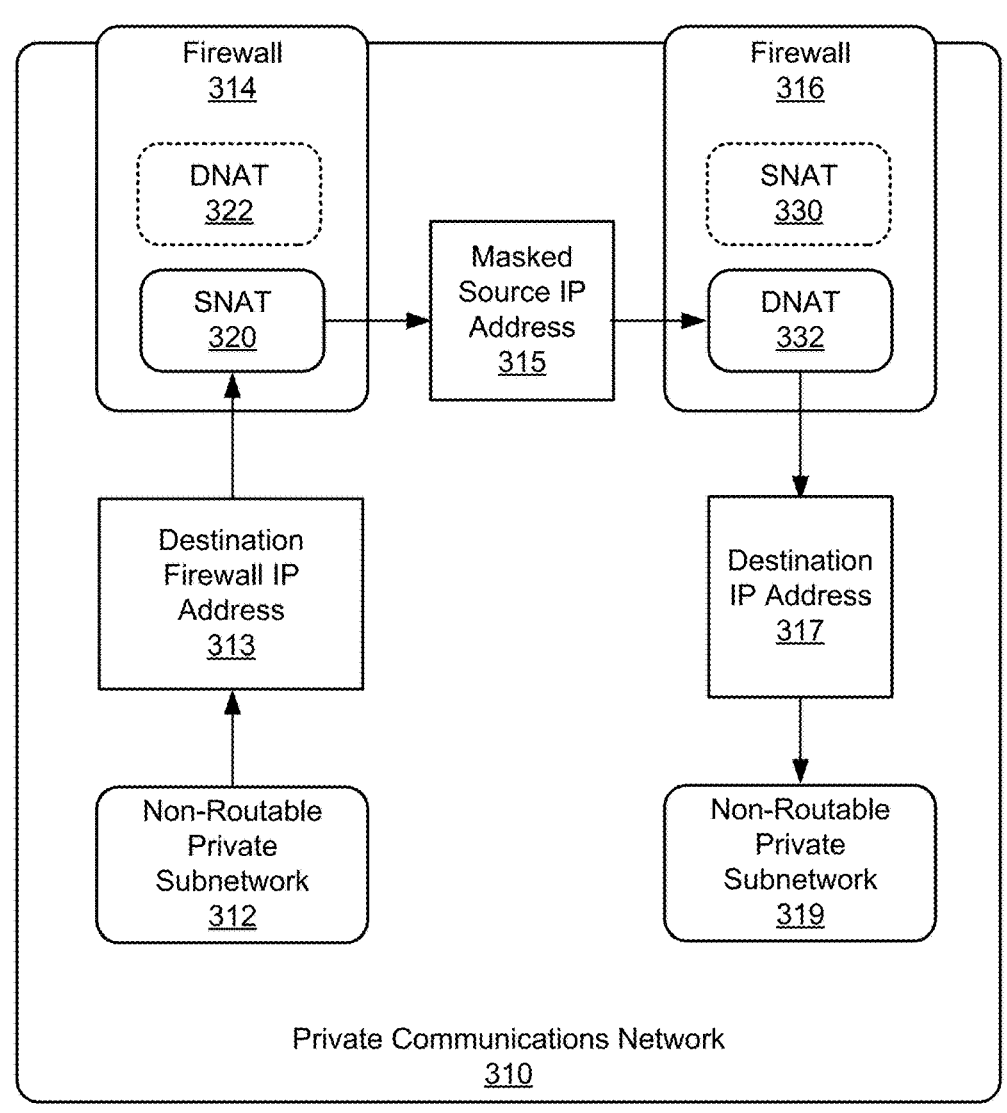
FIG. 3

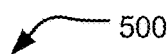
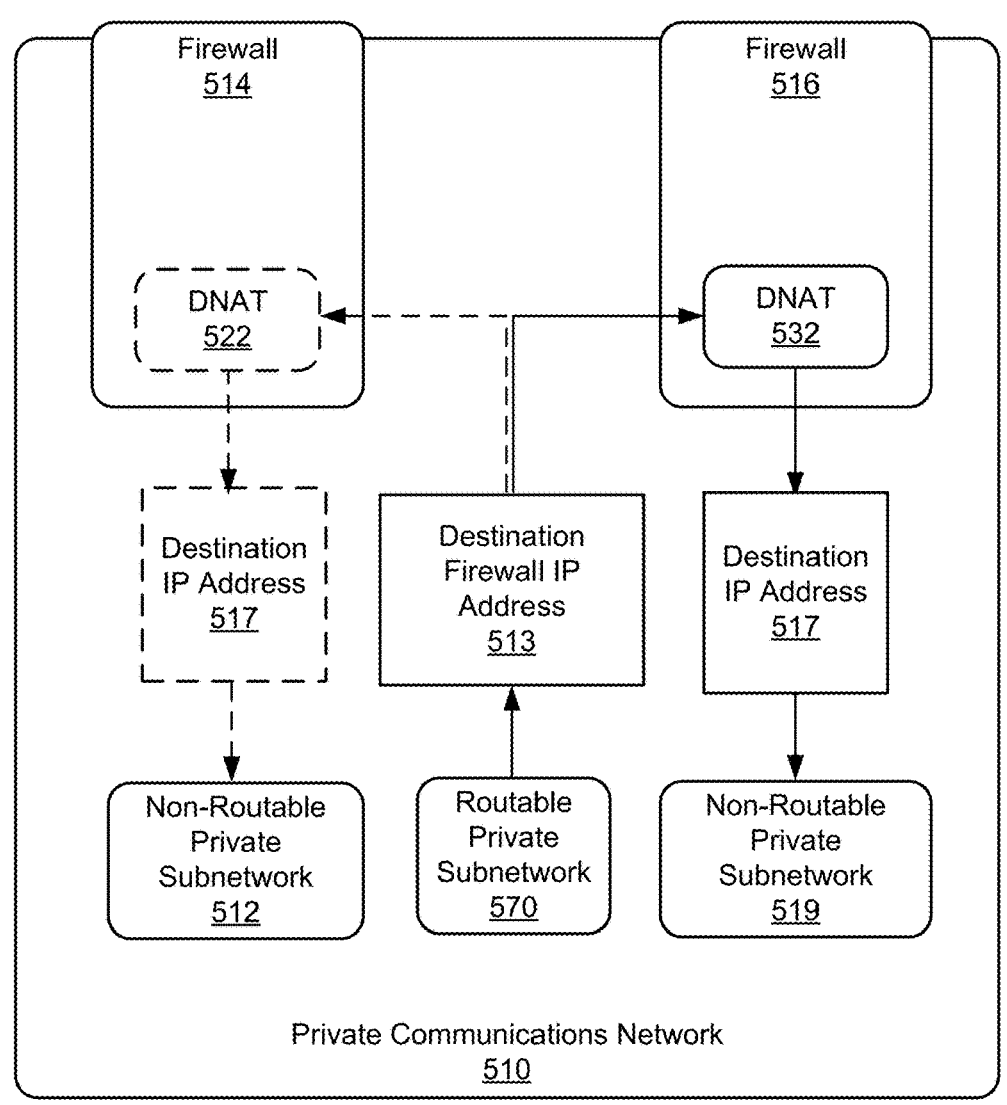
FIG. 5

700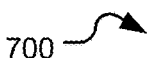

Receive at a firewall, a data packet destined to a conflicting private IP address of the first private subnetwork and the second private subnetwork within the private network, the data packet including a destination IP address identifying the firewall
710

Evaluate at the firewall, the data packet to determine whether a source IP address of the data packet satisfies a routing condition corresponding to a routing rule
720

Apply, at the firewall, the routing rule to determine a translated destination IP address identifying the first private subnetwork
730

Send the data packet to the first private subnetwork
740

FIG. 7

SUPPLEMENTAL DNAT FOR COMMUNICATION WITHIN OVERLAPPING IP ADDRESS SPACE IN A PRIVATE NETWORK

CROSS-REFERENCE TO RELATED APPLICATION

This application claims priority to U.S. Provisional Application No. 63/652,878 filed May 29, 2024, and entitled, "Supplemental DNAT for Communication Within Overlapping IP Address Space in a Private Network." The above-referenced patent application is specifically incorporated herein for all that it discloses and teaches.

BACKGROUND

Conventional cloud computing service providers provide hardware to support customers' virtual networks. In conventional cloud computing services, customers have their own private networks and workloads behind a firewall. Typically, any communication destined for an entity on a private network of a customer coming from the public internet will land at the public IP address at the firewall. The firewall then performs a network address translation (NAT) and transfers the communication to a backend workload/device using the private virtual IP address of the target entity on the virtual network.

SUMMARY

In some aspects, the techniques described herein relate to a method of routing data traffic for a private network including a first private subnetwork and a second private subnetwork having conflicting private internet protocol (IP) addresses, the method including: receiving, at a firewall, a data packet destined to a conflicting private IP address of the first private subnetwork and the second private subnetwork within the private network, the data packet including a destination IP address identifying the firewall; evaluating, at the firewall, the data packet to determine whether a source IP address of the data packet satisfies a routing condition corresponding to a routing rule; applying, at the firewall, the routing rule to determine a translated destination IP address of the first private subnetwork; and sending the data packet to the first private subnetwork.

In some aspects, the techniques described herein relate to one or more tangible processor-readable storage media embodied with instructions for executing on one or more processors and circuits of a computing device a process for routing data traffic for a private network including a first private subnetwork and a second private subnetwork having conflicting private internet protocol (IP) addresses, the process including: receiving, at a firewall, a data packet destined to a conflicting private IP address of the first private subnetwork and the second private subnetwork within the private network, the data packet including a destination IP address identifying the firewall; evaluating, at the firewall, the data packet to determine whether a source IP address of the data packet satisfies a routing condition corresponding to a routing rule; applying, at the firewall, the routing rule to determine a translated destination IP address of the first private subnetwork; and sending the data packet to the first private subnetwork.

In some aspects, the techniques described herein relate to a computing system for routing data traffic for a private network including a first private subnetwork and a second private subnetwork having conflicting private internet protocol (IP) addresses, the computing system including: one or more hardware processors; a communication interface of a firewall executable by the one or more processors and configured to receive a data packet destined to a conflicting private IP address of the first private subnetwork and the second private subnetwork within the private network, the data packet including a destination IP address identifying the computing system; a routing rules determiner of the firewall executable by the one or more processors and configured to evaluate the data packet to determine whether a source IP address of the data packet satisfies a routing condition corresponding to a routing rule; a routing rules applicator of the firewall executable by the one or more processors and configured to apply the routing rule to determine a translated destination IP address of the first private subnetwork, the communication interface of the firewall further configured to send the data packet to the first private subnetwork.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

FIG. 1 illustrates an example computing environment for facilitating communication between non-routable private subnetworks in a private communications network using a supplementary firewall.

FIG. 2 illustrates an example DNAT firewall that performs destination network address translation (DNAT) for use in communications involving at least one non-routable subnetwork within a private communications network.

FIG. 3 illustrates an example computing environment for facilitating communication between non-routable private subnetworks within a private communications network using a supplementary firewall that performs destination network address translation (DNAT).

FIG. 5 illustrates an example computing environment for facilitating communication between a routable subnetwork and a non-routable subnetwork within a private communications network using a supplementary firewall that performs destination network address translation (DNAT).

FIG. 7 illustrates an example method of routing data traffic for a private network including a first private subnetwork and a second private subnetwork having conflicting private IP addresses.

DETAILED DESCRIPTION

Figure 4:
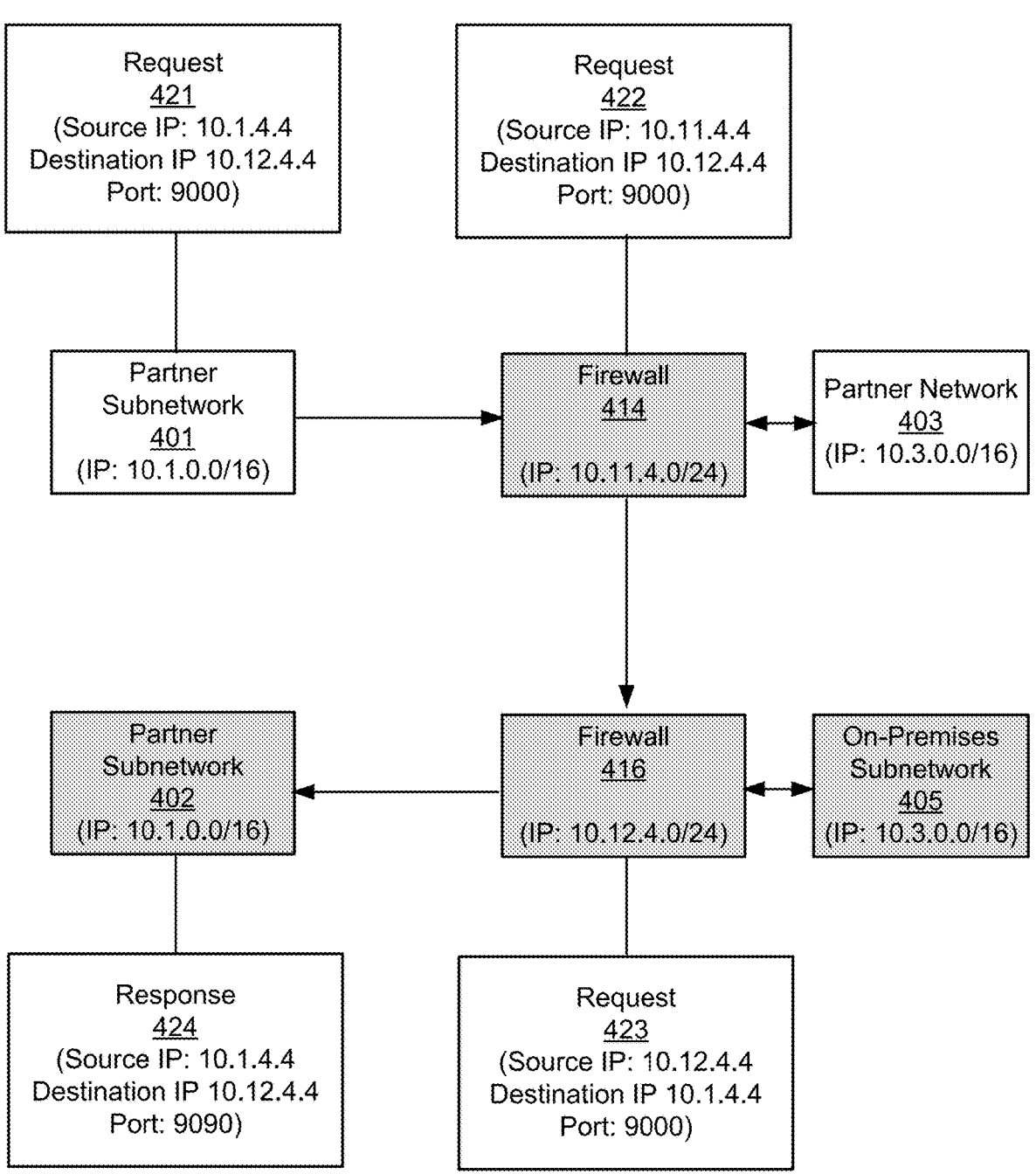
FIG. 4 illustrates an example method of routing data traffic for a private network including a first private subnetwork and a second private subnetwork having conflicting private IP addresses.

Communication between virtual IP networks having overlapping IP addresses is not possible in conventional cloud service provider systems. In other words, virtual IP networks having overlapping IP addresses are "non-routable" IP networks. For example, overlapped virtual IP networks have the same IP address or have IP addresses that are similar enough that the virtual IP networks are not distinguishable from one another based on their IP addresses. In some implementations, overlapped virtual IP networks may have different IP addresses but share the same subnet space. As such, the shared subnet can have conflicting IP addresses. However, customers may need such communication between such non-routable networks when onboarding new partners to their private virtual networks or when integrating new acquisitions into their private virtual networks. Accordingly, certain processes that require communication between overlapping private virtual networks are not possible in the conventional system.

The described technology addresses the deficiencies of conventional approaches to communication between networks in cloud computing services. The described technology provides a DNAT hub (e.g., a firewall) that provides destination network address translation (DNAT) to enable communication between private networks having overlapping IP addresses, which is not possible in the conventional system. For example, the DNAT hub of the disclosed technology receives a communication (e.g., a request, a response, etc.) from a SNAT hub device that masks the source IP address of a first non-routable private network with its own IP address using source network address translation (SNAT). The hub of the disclosed technology then changes, using DNAT, the destination IP address of the communication to indicate a second non-routable private network. The destination IP address indicating the second non-routable private network overlaps with an IP address indicating the first non-routable private network. The DNAT hub of the disclosed technology, in some instances, applies one or more rules to perform the DNAT operation based on one or more of the source IP addresses (e.g., the masked IP address from the other hub) and the destination IP address (e.g., the IP address of the DNAT hub). For example, the rule may state that communications received from the SNAT hub device must be routed to the second non-routable private network.

In other examples, the DNAT hub of the technology disclosed herein receives a communication from an entity outside via the public internet that is destined for a non-routable private network (e.g., a private network having an IP address that overlaps with one or more other private networks). The DNAT hub, in some instances, applies one or more rules to perform the DNAT based on one or more of the source IP address (e.g., the public IP address of the entity) and the destination IP address (e.g., the public IP address of the DNAT hub). For example, the rule may state that communications received from a source IP address indicating the entity must be routed to the non-routable private network.

Accordingly, the described technology, which performs DNAT within a firewall on a private communications network, can enable communication between non-routable networks (e.g., between two private networks having overlapping IP addresses) and/or between a non-routable network and a routable network. Consequently, certain processes, such as onboarding new partners to their private virtual networks or integrating new acquisitions into private virtual networks, which are not possible in the conventional cloud computing services, are possible in the described technology.

FIG. 1 illustrates an example computing environment 100 for facilitating communication between non-routable private subnetworks in a private communications network 110 using a supplementary firewall. Non-routable private subnetworks (e.g., the non-routable private subnetwork 112, the non-routable private subnetwork 119) may include customer subnetworks that are hosted by a cloud computing services provider system within a private communications network 110. For example, cloud services provider systems may offer access, management, and the development of applications and services through data centers. Cloud services provider systems may provide a range of capabilities, including software as a service (SaaS), platform as a service (PaaS), and infrastructure as a service (IaaS), and may support many programming languages, tools, and frameworks, including software and systems. Customer subnetworks hosted within the private communications network 110 can include government subnetworks, company subnetworks, or other customer subnetworks. In some implementations, one or more non-routable private subnetworks are virtual networks. In some implementations, one or more non-routable networks use overlay network technology, where the virtual network is different from the physical network that hosts the virtual machines.

The non-routable private subnetwork 112 and the non-routable private subnetwork 119 have overlapping IP addresses within the private communications network 110. For example, the non-routable private subnetwork 112 and the non-routable private subnetwork 119 have the same IP address or have IP addresses that otherwise do not distinguish the non-routable private subnetwork 112 and the non-routable private subnetwork 119 within the private communications network 110. Accordingly, as depicted in FIG. 1, the non-routable private subnetwork 112 and the non-routable private subnetwork 119 are unable to communicate with each other directly.

Instead, the firewall 114 and the firewall 116 facilitate communication between the non-routable private subnetwork 112 and the non-routable private subnetwork 119, as indicated by the arrows in FIG. 1. In some implementations, the firewalls (e.g., the firewall 114 and the firewall 116) monitor traffic to or from the private communications network 110 and allow or block traffic based on a defined set of security rules. In some instances, the firewall 114 is a component of the non-routable private subnetwork 112, and the firewall 116 is a component of the non-routable private subnetwork 119. The firewall 114 is able to communicate with the non-routable private subnetwork 112 but is not able to communicate with the non-routable private subnetwork 119. Also, the firewall 116 is able to communicate with the non-routable private subnetwork 119 but is not able to communicate with the non-routable private subnetwork 112. Each of the firewall 114 and the firewall 116 may perform one or more SNAT and/or DNAT operations. SNAT is a technique that changes the source IP address of a packet, and DNAT is a technique that changes the destination IP address of a packet.

In the example depicted in FIG. 1, the non-routable private subnetwork 112 transmits a communication (e.g., a request, a response, etc.) to the firewall 114, which performs SNAT to mask the source IP of the request (e.g., the original source IP address indicating the on-routable private subnetwork 112) and replaces the source IP address with the IP address of the firewall 114. The firewall 114 routes the request to the firewall 116, which performs DNAT to replace the destination IP of the request to identify the firewall 116, with the IP address of the non-routable private subnetwork 119 and performs SNAT to replace the source IP address of the firewall 114 with its own IP address (the firewall 116 IP address) as the source IP address. The firewall 116 routes the communication received from the firewall 114 to the non-routable private subnetwork 119. The firewall 116 can communicate with the non-routable private subnetwork 119 and is not aware of the non-routable private subnetwork 112. No two virtual networks with overlapping IP addresses can be peered. Because the non-routable private subnetwork 112 and the non-routable private subnetwork 119 cannot be directly peered with the firewall 116, the firewall 116 will never encounter a challenge in distinguishing the non-routable private subnetwork 112 and the non-routable private subnetwork 119. In other words, the firewall 116 will only have knowledge about the non-routable private subnetwork 119.

In other examples, the non-routable private subnetwork 119 transmits a communication (e.g., a request, a response, etc.) to the firewall 116, which performs SNAT to mask the source IP of the request (e.g., the original source IP address indicating the non-routable private subnetwork 119) and replaces the source IP address with the IP address of the firewall 116. The firewall 116 routes the request to the firewall 114, which performs DNAT to replace the destination IP of the request, which identifies the firewall 114, with the IP address of the non-routable private subnetwork 112. The firewall 114 routes the communication received from the firewall 116 to the non-routable private subnetwork 112. The firewall 114 is able to communicate with the non-routable private subnetwork 112 and is not aware of the non-routable private subnetwork 119.

FIG. 2 illustrates an example DNAT firewall 216 that performs destination network address translation (DNAT) for use in communications involving at least one non-routable subnetwork within a private communications network. Within the computing environment 200, the general functionality of the DNAT firewall 216 is the same or similar to that described with respect to like-named components of other figures herein. The DNAT firewall 216 executes on the private communications network and may communicate with one or more of the subnetworks on the private communications network or networks separate from the private communications network. The DNAT firewall 216 includes rules 260 (e.g., stored in a memory accessible to the DNAT firewall 216), a communication interface 261, a routing rules determiner 263, a routing rules applicator 265, and a traffic logger 267. The DNAT firewall 216 receives (e.g., using the communication interface 261) a request 250 that includes a source IP address 253 and a destination IP address 213. The communication interface 261 is configured to communicate with the non-routable subnetwork but not with any other subnetworks having a conflicting IP address with the non-routable subnetwork. In some instances, the request 250 may be a responsive communication. In some implementations, the request 250 is received from a non-routable subnetwork of the private communications network, and the source IP address 253 is the IP address of the non-routable subnetwork. In some implementations, the request 250 is received from another network (e.g., a public network) outside of the private communications network, and the source IP address 253 is the IP address of the other network. The destination IP address 213 is the IP address of the DNAT firewall 216.

The DNAT firewall 216 performs DNAT on the destination IP address 213 to replace the destination IP address 213 with a translated destination IP address 217 that is different from the destination IP address 213. The DNAT firewall 216 applies one or more rules 260 to the data received in the request 250 to determine the translated destination IP address 217. For example, the rules 260 may include a lookup table or other data structure that associates a translated destination IP address 217 with one or more of the source IP address 253, the destination IP address 213, or other data received in the request 250. The rules 260 may include a flowchart or other rules-based data structure that is applied to one or more of the source IP address 253, the destination IP address 213, or other data received in the request 250 to determine the translated destination IP address 217. In some implementations, a DNAT rule consists of the following parameters: Source IP address, Destination IP address/Port number, Protocol (TCP/UDP), and Translated IP address/Port number. In these implementations, the DNAT rule is applied to these parameters to determine the translated destination IP address 217. These parameters are examples, and more or less than these listed parameters may be used. In some implementations, the parameters can be determined from an IP header with 5 tuple information (SRC IP, SRC PORT, DST IP, DST PORT, PROTOCOL) to take DNAT actions. The routing rules determiner 263 determines, based on the parameters identified in the request 250, that a source IP address of the data packet satisfies a routing condition corresponding to a particular rule of the rules 260. The routing rules applicator 265 applies the routing rule to determine the translated destination IP address 217, and the routing rules applicator 265 performs the DNAT operation to replace the destination IP address 213 in the request 250 with the translated destination IP address 217. Some implementations can include the routing rules determiner 263 inspecting other fields of packet information to determine the parameters for applying the one or more rules.

The DNAT firewall 216 transmits a request 270 to a destination entity identified by the translated destination IP address 217. The request 270 may include the same information as the request 250 except with the destination IP address 213 changed to the translated destination IP address 217. In some implementations, the destination entity is a non-routable subnetwork of the private communication network. In some implementations, the DNAT firewall 216 can perform SNAT on the request 250 to change (e.g., mask) the source IP address 253 with the IP address of the DNAT firewall 216 and then route the request (e.g., as request 270) to an entity associated with the destination IP address 213. In some implementations, the traffic logger 267 updates a log of packet traffic responsive to routing the request to the entity. In some implementations, a firewall (e.g., DNAT firewall 216) consists of several virtual machines at the backend. One of the virtual machines processes the DNAT rule and replaces the source IP address with the Virtual Machines address so that the return traffic may land at the same firewall virtual machine for traffic symmetry. In some implementations, for a public DNAT scenario (receiving a request from the internet), a firewall may perform both SNAT and DNAT operations. In some implementations, the default action is not SNAT for private IP ranges (e.g., based on RFC 1918). In these implementations, the flow symmetry is maintained by an Internal Load Balancer by hashing the connections or requests to the same backend instance.

FIG. 3 illustrates an example computing environment 300 for facilitating communication between non-routable private subnetworks within a private communications network 310 using a supplementary firewall that performs destination network address translation (DNAT). Within the computing environment 300, the general functionality of the components of FIG. 3 is the same or similar to that described with respect to like-named components of other figures herein.

The private communications network 310 includes a non-routable private subnetwork 312 and a non-routable private subnetwork 319, which have overlapping IP addresses. The private communications network 310 also includes a firewall 314 and a firewall 316. In some implementations, the firewall 314 can perform SNAT 320 operations and DNAT 322 operations. Likewise, the firewall 316 can perform SNAT 330 operations and DNAT 332 operations. In some implementations, the firewall 314 includes a DNAT component that performs the DNAT 322 operations and an SNAT component that performs the SNAT 320 operations. In some implementations, the firewall 316 includes a DNAT component that performs the DNAT 332 operations and an SNAT component that performs the SNAT 330 operations. For example, SNAT replaces a source IP address of a communication with a source IP address of the firewall. DNAT replaces a destination IP address of a communication with another destination IP address.

In the example depicted in FIG. 3, non-routable private subnetwork 312 transmits a communication (e.g., a request, a response, etc.) to firewall 314. The communication includes a destination firewall IP address 313 that identifies the firewall 316, as illustrated in FIG. 3. The firewall 314 performs an SNAT 320 operation to change the source IP address in the received communication from the IP address of the non-routable private subnetwork 312 to the masked source IP address 315, which is the IP address of the firewall 314. The firewall 316 receives the communication from the firewall 314 that includes the masked source IP address 315 and the destination IP address associated with firewall 316. The firewall 316 performs a DNAT 332 operation to replace the destination IP address associated with the firewall 316 with a destination IP address 317. The destination IP address 317 identifies the non-routable private subnetwork 319. The firewall 316 routes the communication to the non-routable private subnetwork 319 associated with the destination IP address 317. In some implementations, the firewall 316 is able to communicate with the non-routable private subnetwork 319 and is not aware of the non-routable private subnetwork 312.

FIG. 4 illustrates destination private network address translation (DNAT) enabling integration between two overlapping IP subnetworks (e.g., partner subnetwork 401 and partner subnetwork 402). The general functionality of the components of FIG. 4 is the same or similar to that described concerning like-named components of other figures herein. As illustrated in FIG. 4, a partner subnetwork 401 is onboarding to a customer network. Customer networks include partner subnetwork 402, a firewall 414, a firewall 416, and an on-premises subnetwork 405, which are indicated via shading in FIG. 4. In some instances, customers rely on partners to speed up projects but have no way to control partners' IP addresses. Accordingly, IP addresses may overlap with the subnetworks of the customer networks, and customers need a solution to help partners connect seamlessly. Likewise, the partner network 403, in some implementations, communicates to the on-premises subnetwork 405, and the NAT on private is a very seamless way to communicate across overlapped IP addresses.

In the example depicted in FIG. 4, the firewall 414 provides SNAT functionality for newly onboarded networks. The firewall 414 may be in a first hub. The first hub may be a secure virtual hub having associated security and routing policies. The partner subnetwork 401 may be a newly onboarded subnetwork. In a first step, the partner subnetwork 401, as depicted in FIG. 4, transmits a request 421 to the firewall 414 that includes a source IP address 10.1.4.4 identifying the partner subnetwork 401 and a destination IP address 10.12.4.4 identifying the firewall 416. In a second step, the firewall 414 performs SNAT to mask the source destination IP address 10.1.4.4 with the IP address 10.11.4.4 of the firewall 414 to yield the request 422. The firewall 416 may be in a second hub. The firewall 416 provides DNAT functionalities to publish applications in its networks to destination entities (e.g., partners & new branch offices). The firewall 416 also performs SNAT functionalities. Accordingly, in a third step, the firewall 416 performs a DNAT operation to replace the destination IP address of 10.12.4.4 that identified the firewall 416 with a destination IP address of 10.1.4.4 and performs an SNAT operation to replace the source IP address of 10.11.4.4 with a source IP address of 10.12.4.4 to yield request 423. The destination IP address identifies the partner subnetwork 402. In a fourth step, the partner subnetwork 402 provides a response 424 with a source IP address of 10.1.1.4 and a destination IP address of 10.12.4.4.

FIG. 4 also depicts the partner network 403, which is a network external to the on-premises network. As depicted in FIG. 4, the S3 partner network can communicate with the partner subnetwork 401 via the firewall 414. For example, the partner network 403 transmits a request including a destination IP address identifying the firewall 414 and a source IP address identifying the partner network 403. The firewall 414 applies one or more rules to determine, in a DNAT operation, a destination IP address corresponding to the partner subnetwork 401 and replaces the destination IP address with the IP address of the partner subnetwork 401 (e.g., 10.1.4.4). The firewall 414 forwards the request to the partner subnetwork 401. In some instances, the partner network 403 can communicate with the partner subnetwork 402 via the firewall 416. For example, the partner network 403 transmits a request including a destination IP address identifying the firewall 416 and a source IP address identifying the partner network 403. The firewall 416 applies one or more rules to determine, in a DNAT operation, a destination IP address corresponding to the partner subnetwork 402 and replaces the destination IP address with the IP address of the partner subnetwork 402 (e.g., 10.1.4.4). The firewall 416 forwards the request to the partner subnetwork 402.

FIG. 5 illustrates an example computing environment 500 for facilitating communication between a routable subnetwork and a non-routable subnetwork within a private communications network 510 using a supplementary firewall that performs destination network address translation (DNAT). Within the computing environment 500, the general functionality of the components of FIG. 5 is the same or similar to that described with respect to like-named components of other figures herein. The private communications network 510 includes a non-routable private subnetwork 512 and a non-routable private subnetwork 519, which have overlapping IP addresses. The private communications network 510 also includes a firewall 514 and a firewall 516. In some implementations, the firewall 514 can perform DNAT 522 operations. Likewise, the firewall 516 can perform DNAT 532 operations. DNAT replaces a destination IP address of a communication with another destination IP address. Routable private subnetwork 570 has an IP address that does not overlap with the IP addresses of the non-routable private subnetwork 512 and the non-routable private subnetwork 519.

In the example depicted in FIG. 5, the routable private subnetwork 570 transmits a communication (e.g., a request, a response, etc.) to the firewall 516. The communication includes a destination firewall IP address 513 that identifies the firewall 516, as illustrated in FIG. 5. The firewall 516 performs a DNAT 532 operation to replace the destination IP address associated with the firewall 516 with a destination IP address 517. The destination IP address 517 identifies the non-routable private subnetwork 519. The firewall 516 routes the communication to the non-routable private sub-network 519 associated with the destination IP address 517. In some implementations, the firewall 516 can communicate with the non-routable private subnetwork 519 and is not aware of the non-routable private subnetwork 512.

In another example depicted in FIG. 5, depicted in part via dashed arrows, the routable private subnetwork 570 trans-mits a communication (e.g., a request, a response, etc.) to firewall 514. The communication includes a destination firewall IP address 513 that identifies the firewall 514, as illustrated in FIG. 5. The firewall 514 performs a DNAT 522 operation to replace the destination IP address associated with the firewall 514 with a destination IP address 517. The destination IP address 517 identifies the non-routable private subnetwork 512. The firewall 514 routes the communication to the non-routable private subnetwork 512 associated with the destination IP address 517. In some implementations, the firewall 514 can communicate with the non-routable private subnetwork 512 and is not aware of the non-routable private subnetwork 519.

In another example, the non-routable private subnetwork 512 transmits a request to firewall 514 that includes a destination IP address identifying the firewall 514, and the firewall 514 performs an SNAT operation to replace (e.g., mask) the source IP address identifying the non-routable private subnetwork with a source IP address identifying the firewall 514. The firewall 514 performs a DNAT operation and routes the request to the routable private subnetwork 570. For example, the firewall 514 receives a packet with firewall 514 as the destination IP address. The firewall 514 will also perform a DNAT to route the request to the routable private subnetwork 570. Without the DNAT rule, the firewall 514 will have no means to know what the actual destination is. In some implementations, the original request from the non-routable private subnetwork 512 can include a destina-tion IP address that is the IP address of the routable private subnetwork 570 instead of the IP address of the firewall 514 and can include a user-defined route to force the traffic to the firewall 514 as next hop and create an allow rule on the firewall 514 for this traffic. For example, the firewall 514 is the next hop without the DNAT rule. For example, the "next hop" means a user can configure a UDR (User Defined Route), which says any traffic from non-routable private subnetwork 512 destined to the routable private subnetwork 570 should be directed to the firewall 514 as the next hop. For example, the firewall 514 also has an allow network rule (which means if the packet lands with the source IP address as non-routable private subnetwork 512 and destination IP address as routable private subnetwork 570, the firewall 514 accepts the packet and forwards it to the correct destination or next hop).

In these implementations, because the routable private subnetwork 570 is a routable network, the firewall 514 knows where to route the traffic.

In another example, non-routable private subnetwork 519 transmits a request to the firewall 516 that includes a destination IP address identifying the firewall 516, and the firewall 516 performs an SNAT operation to replace (e.g., mask) the source IP address identifying the non-routable private subnetwork with a source IP address identifying the firewall 516 and DNAT operation identifying the address of routable private subnetwork 570. The firewall 516 routes the request to the routable private subnetwork 570.

Figure 6:
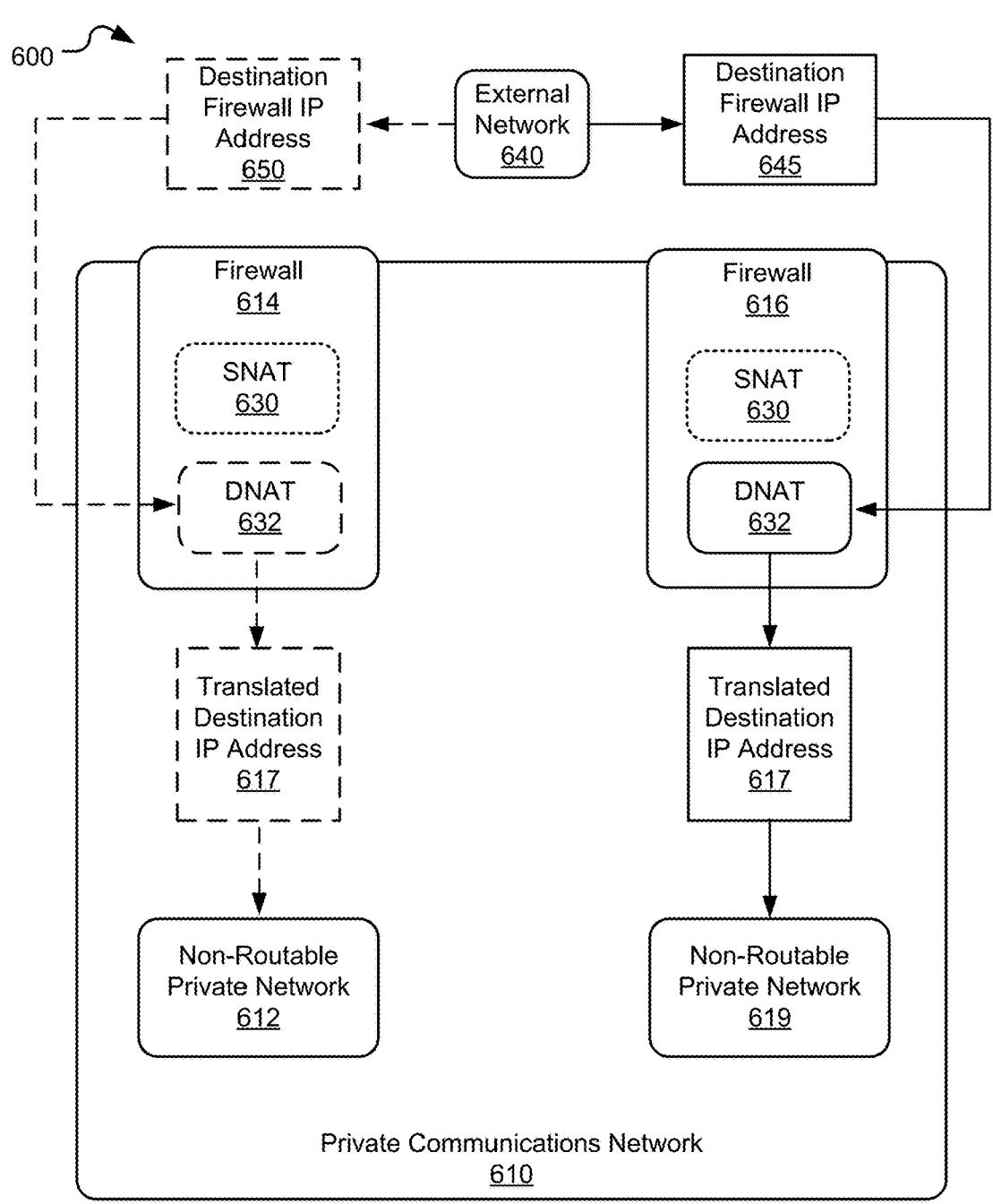
FIG. 6 illustrates an example computing environment for facilitating communication between an external network and one or more non-routable subnetworks within a private communications network using firewalls that perform destination network address translation (DNAT).

FIG. 6 illustrates an example computing environment 600 for facilitating communication between an external network and one or more non-routable subnetworks within a private communications network 610 using firewalls that perform destination network address translation (DNAT). Within the computing environment 600, the general functionality of the components of FIG. 6 is the same or similar to that described with respect to like-named components of other figures herein.

The private communications network 610 includes a non-routable private subnetwork 612 and a non-routable private subnetwork 619, which have overlapping IP addresses. The private communications network 610 also includes a firewall 614 and a firewall 616. In some imple-mentations, the firewall 614 can perform DNAT 632 opera-tions. Likewise, the firewall 616 can perform DNAT 632 operations. DNAT replaces a destination IP address of a communication with another destination IP address.

In the example depicted in FIG. 6, an external network 640 (e.g., an external private network within the cloud or network that is otherwise external to the private communi-cations network 610) transmits a communication (e.g., a request, a response, etc.) to the firewall 616. The commu-nication includes a destination firewall IP address 645 that identifies the firewall 616, as illustrated in FIG. 6. The firewall 616 performs a DNAT 632 operation to replace the destination IP address associated with the firewall 616 with a destination IP address 617. The destination IP address 617 identifies the non-routable private subnetwork 619. The firewall 616 routes the communication to the non-routable private subnetwork 619 associated with the destination IP address 617. In some implementations, the firewall 616 is able to communicate with the non-routable private subnet-work 619 and is not aware of the non-routable private subnetwork 612.

In another example depicted in FIG. 6, depicted partly via dashed arrows, the external network 640 transmits a com-munication (e.g., a request, a response, etc.) to the firewall 614. The communication includes a destination firewall IP address 650 that identifies the firewall 614, as illustrated in FIG. 6. The firewall 614 performs a DNAT 632 operation to replace the destination IP address associated with the fire-wall 614 with a destination IP address 617. The destination IP address 617 identifies the non-routable private subnet-work 612. The firewall 614 routes the communication to the non-routable private subnetwork 612 associated with the destination IP address 617. In some implementations, the firewall 614 is able to communicate with the non-routable private subnetwork 612 and is not aware of the non-routable private subnetwork 619.

In another example, the non-routable private subnetwork 612 transmits a request to the firewall 614 that includes a destination IP address identifying the external network 640, and the firewall 614 performs an SNAT operation 630 to replace (e.g., mask) the source IP address identifying the non-routable private subnetwork 612 with a source IP address identifying the firewall 614. The firewall 614 routes the request to the external network 640. In some implemen-tations where the IP addresses of the non-routable private subnetwork 612 and the external network 640 do not over-lap, and the external network 640 is on the internet, the firewall 614 performs the SNAT operation by default both at the virtual machine instance level with its source IP address and also at the host level with Public IP of the firewall 614, to maintain traffic symmetric and not to mask the source IP address. In some scenarios, if the external network 640 is also a private network, the firewall 614 does not perform SNAT on the private IP (as per RFC 1918) by default. In such scenarios, both sides can configure UDR to a Firewall Private IP (e.g., an Internal Load Balancer) so that return traffic lands on the same instance for traffic symmetry In another example, a non-routable private subnetwork 619 transmits a request to firewall 616 that includes a destination IP address identifying the external network 640, and the firewall 616 performs a SNAT operation 630 to replace (e.g., mask) the source IP address identifying the non-routable private subnetwork 619 with a source IP address identifying the firewall 616. The firewall 616 routes the request to the external network 640. In some implementations, the non-routable private subnetwork 619 transmits a request to the firewall 614 as the destination IP and the firewall 614 performs DNAT to route the request to the external network 640.

FIG. 7 illustrates a method 700 of routing data traffic for a private network including a first private subnetwork and a second private subnetwork having conflicting private IP addresses. The method 700 includes a receiving operation 710, an evaluating operation 720, an applying operation 730, and a sending operation 740. In some implementations, the conflicting private IP addresses are the same private IP address or are private IP addresses that otherwise overlap. In some implementations, the firewall is not able to communicate with the second private subnetwork and is not able to route communications to the second private subnetwork.

The receiving operation 710 receives, at a firewall, a data packet destined to a conflicting private IP address of the first private subnetwork and the second private subnetwork within the private network, the data packet including a destination IP address identifying the firewall. In some implementations, the data packet is received from a previous firewall, an initial destination IP address of the data packet identifies the firewall, and an initial source IP address of the data packet identifies the previous firewall. For example, the previous firewall receives an initial data packet destined to the conflicting private IP address, the initial data packet including a destination IP address identifying the firewall and a source IP address identifying the conflicting private IP address. In this example, the previous firewall masks the source IP address identifying the conflicting private IP address with an IP address of the previous firewall to generate the request and transmit the request to the firewall.

The evaluating operation 720 evaluates, at the firewall, the data packet to determine whether a source IP address of the data packet satisfies a routing condition corresponding to a routing rule. For example, the evaluating operation 720 may include inspecting one or more fields of data packet information to determine the parameters for applying the one or more rules.

The applying operation 730 applies, at the firewall, the routing rule to determine a translated destination IP address identifying the first private subnetwork. The applying operation 730 may further include replacing, in a DNAT operation, the previous destination IP address of the data packet with the translated destination IP address.

The sending operation 740 sends the data packet to the first private subnetwork. In some implementations, the sending operation 740 includes updating a log of packet traffic responsive to sending the data packet.

Figure 8:
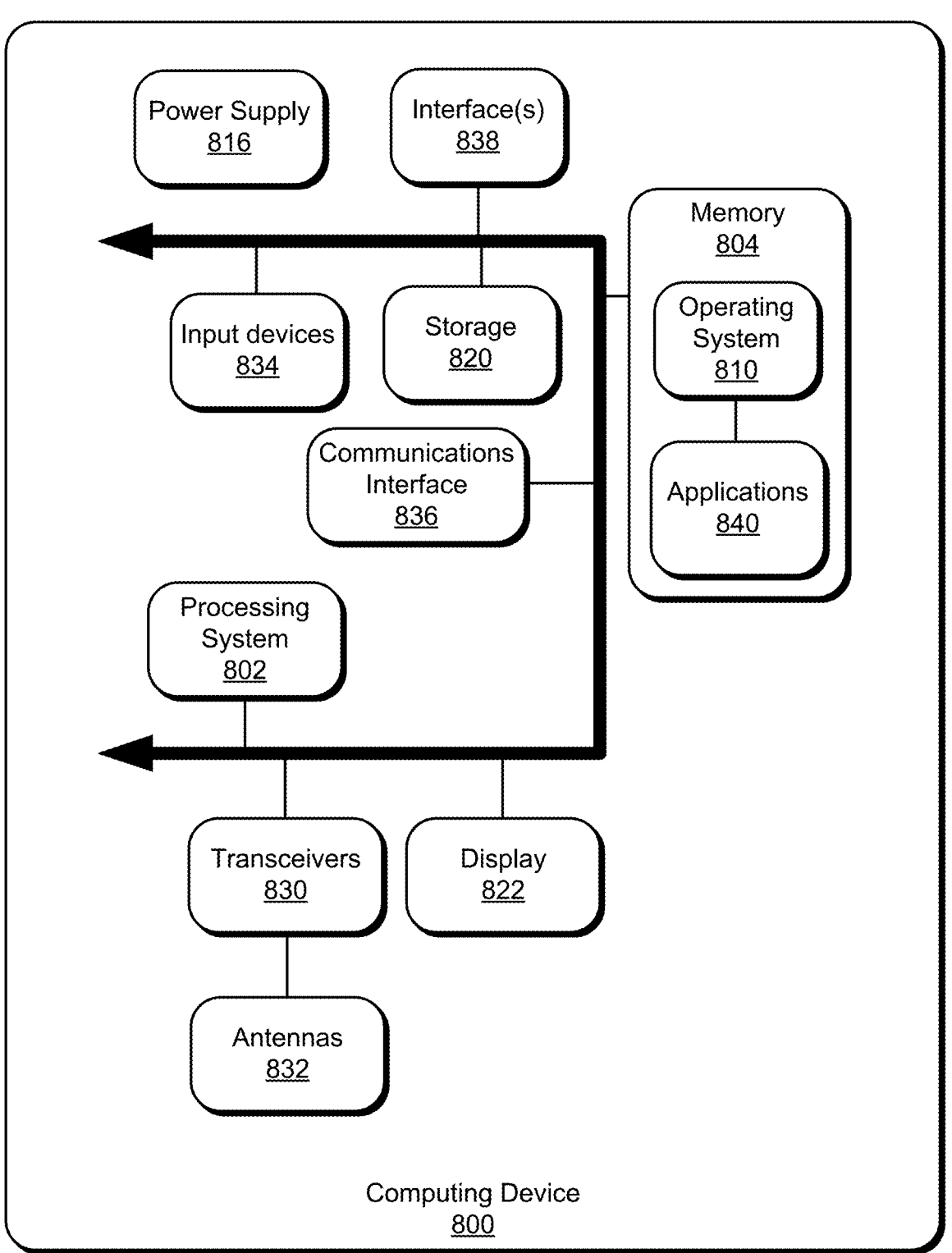
FIG. 8 illustrates an example computing device for use in implementing the described technology.

FIG. 8 illustrates an example computing device 800 for use in implementing the described technology. The computing device 800 may be a client computing device (such as a laptop computer, a desktop computer, or a tablet computer), a server/cloud computing device, an Internet-of-Things (IoT), any other type of computing device, or a combination of these options. The computing device 800 includes one or more hardware processor(s) 802 and a memory 804. The memory 804 generally includes both volatile memory (e.g., RAM) and nonvolatile memory (e.g., flash memory), although one or the other type of memory may be omitted. An operating system 810 resides in the memory 804 and is executed by the processor(s) 802. In some implementations, the computing device 800 includes and/or is communicatively coupled to storage 820.

In the example computing device 800, as shown in FIG. 8, one or more software modules, segments, and/or processors, such as applications 840, a firewall, a DNAT component, a SNAT component, a non-routable private subnetwork, a routable-private subnetwork, and other program code and modules are loaded into the operating system 810 on the memory 804 and/or the storage 820 and executed by the processor(s) 802. The storage 820 may store one or more source IP addresses, one or more destination IP addresses, one or more rules or data structures used to perform one or more of DNAT or SNAT operations, and other data and be local to the computing device 800 or may be remote and communicatively connected to the computing device 800. In particular, in one implementation, components of a system for classifying a dataset may be implemented entirely in hardware or in a combination of hardware circuitry and software.

The computing device 800 includes a power supply 816, which may include or be connected to one or more batteries or other power sources, and which provides power to other components of the computing device 800. The power supply 816 may also be connected to an external power source that overrides or recharges the built-in batteries or other power sources.

The computing device 800 may include one or more communication transceivers 830, which may be connected to one or more antenna(s) 832 to provide network connectivity (e.g., mobile phone network, Wi-Fi®, Bluetooth®) to one or more other servers, client devices, IoT devices, and other computing and communications devices. The computing device 800 may further include a communications interface 836 (such as a network adapter or an I/O port, which are types of communication devices). The computing device 800 may use the adapter and any other types of communication devices for establishing connections over a wide-area network (WAN) or local-area network (LAN). It should be appreciated that the network connections shown are exemplary and that other communications devices and means for establishing a communications link between the computing device 800 and other devices may be used.

The computing device 800 may include one or more input devices 834 such that a user may enter commands and information (e.g., a keyboard, trackpad, or mouse). These and other input devices may be coupled to the server by one or more interfaces 838, such as a serial port interface, parallel port, or universal serial bus (USB). The computing device 800 may further include a display 822, such as a touchscreen display.

The computing device 800 may include a variety of tangible processor-readable storage media and intangible processor-readable communication signals. Tangible processor-readable storage can be embodied by any available media that can be accessed by the computing device 800 and can include both volatile and nonvolatile storage media and removable and non-removable storage media. Tangible processor-readable storage media excludes intangible, transitory communications signals (such as signals per se) and includes volatile and nonvolatile, removable, and non-removable storage media implemented in any method, process, or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 800. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of routing data traffic for a private network including a first private subnetwork and a second private subnetwork having conflicting private internet protocol (IP) addresses, the method comprising: receiving, at a firewall, a data packet destined to a conflicting private IP address of the first private subnetwork and the second private subnetwork within the private network, the data packet including a destination IP address identifying the firewall; evaluating, at the firewall, the data packet to determine whether a source IP address of the data packet satisfies a routing condition corresponding to a routing rule; applying, at the firewall, the routing rule to determine a translated destination IP address of the first private subnetwork; and sending the data packet to the first private subnetwork.

Clause 2. The method of clause 1, further comprising: updating a log of packet traffic responsive to sending the data packet.

Clause 3. The method of clause 1, wherein the firewall is not able to communicate with the second private subnetwork and is not able to route communications to the second private subnetwork.

Clause 4. The method of clause 1, wherein the conflicting IP addresses are a same IP address.

Clause 5. The method of clause 1, the data packet being received from a previous firewall, a previous destination IP address of the data packet identifying the firewall, and a previous source IP address of the data packet identifying the previous firewall.

Clause 6. The method of clause 5, wherein applying the routing rule includes replacing the previous destination IP address of the data packet with the translated destination IP address.

Clause 7. The method of clause 1, wherein the data packet is received from a previous firewall, the method further comprising: receiving, at the previous firewall, an initial data packet destined to the conflicting private IP address, the initial data packet including a destination IP address identifying the firewall and a source IP address identifying the conflicting private IP address; masking, at the previous firewall, the source IP address identifying the conflicting private IP address with an IP address of the previous firewall to generate the data packet; and transmitting, at the previous firewall, the data packet to the firewall.

Clause 8. One or more tangible processor-readable storage media embodied with instructions for executing on one or more processors and circuits of a computing device a process for routing data traffic for a private network including a first private subnetwork and a second private subnetwork having conflicting private internet protocol (IP) addresses, the process comprising: receiving, at a firewall, a data packet destined to a conflicting private IP address of the first private subnetwork and the second private subnetwork within the private network, the data packet including a destination IP address identifying the firewall; evaluating, at the firewall, the data packet to determine whether a source IP address of the data packet satisfies a routing condition corresponding to a routing rule; applying, at the firewall, the routing rule to determine a translated destination IP address of the first private subnetwork; and sending the data packet to the first private subnetwork.

Clause 9. The one or more tangible processor-readable storage media of clause 8, the process further comprising: updating a log of packet traffic responsive to sending the data packet.

Clause 10. The one or more tangible processor-readable storage media of clause 8, wherein the firewall is not able to communicate with the second private subnetwork and is not able to route communications to the second private subnetwork.

Clause 11. The one or more tangible processor-readable storage media of clause 8, wherein the conflicting IP addresses are a same IP address.

Clause 12. The one or more tangible processor-readable storage media of clause 8, the data packet being received from a previous firewall, a previous destination IP address of the data packet identifying the firewall, and a previous source IP address of the data packet identifying the previous firewall.

Clause 13. The one or more tangible processor-readable storage media of clause 12, wherein applying the routing rule includes replacing the previous destination IP address of the data packet with the translated destination IP address.

Clause 14. The one or more tangible processor-readable storage media of clause 8, wherein the data packet is received from a previous firewall, the process further comprising: receiving, at the previous firewall, an initial data packet destined to the conflicting private IP address, the initial data packet including a destination IP address identifying the firewall and a source IP address identifying the conflicting private IP address; masking, at the previous firewall, the source IP address identifying the conflicting private IP address with an IP address of the previous firewall to generate the data packet; and transmitting, at the previous firewall, the data packet to the firewall.

Clause 15. A computing system for routing data traffic for a private network including a first private subnetwork and a second private subnetwork having conflicting private internet protocol (IP) addresses, the computing system comprising: one or more hardware processors; a communication interface of a firewall executable by the one or more hardware processors and configured to receive a data packet destined to a conflicting private IP address of the first private subnetwork and the second private subnetwork within the private network, the data packet including a destination IP address identifying the computing system; a routing rules determiner of the firewall executable by the one or more hardware processors and configured to evaluate the data packet to determine whether a source IP address of the data packet satisfies a routing condition corresponding to a routing rule; and a routing rules applicator of the firewall executable by the one or more hardware processors and configured to apply the routing rule to determine a translated destination IP address of the first private subnetwork, wherein the communication interface of the firewall is further configured to send the data packet to the first private subnetwork.

Clause 16. The computing system of clause 15, further comprising: a traffic logger executable by the one or more processors and configured to update a log of packet traffic responsive to sending the data packet.

Clause 17. The computing system of clause 15, wherein the communication interface of the firewall is not able to communicate with the second private subnetwork and is not able to route communications to the second private subnetwork.

Clause 18. The computing system of clause 15, wherein the conflicting IP addresses are a same IP address.

Clause 19. The computing system of clause 15, the data packet being received from a previous firewall, a previous destination IP address of the data packet identifying the firewall, and a previous source IP address of the data packet identifying the previous firewall.

Clause 20. The computing system of clause 19, wherein applying the routing rule includes replacing the previous destination IP address of the data packet with the translated destination IP address.

Clause 21. A system for routing data traffic for a private network including a first private subnetwork and a second private subnetwork having conflicting private internet protocol (IP) addresses, the system comprising: means for receiving, at a firewall, a data packet destined to a conflicting private IP address of the first private subnetwork and the second private subnetwork within the private network, the data packet including a destination IP address identifying the firewall; means for evaluating, at the firewall, the data packet to determine whether a source IP address of the data packet satisfies a routing condition corresponding to a routing rule; applying, at the firewall, the routing rule to determine a translated destination IP address of the first private subnetwork; and means for sending the data packet to the first private subnetwork.

Clause 21. The system of clause 21, further comprising: means for updating a log of packet traffic responsive to sending the data packet.

Clause 23. The system for clause 21, wherein the firewall is not able to communicate with the second private subnetwork and is not able to route communications to the second private subnetwork.

Clause 24. The system of clause 21, wherein the conflicting IP addresses are a same IP address.

Clause 25. The system of clause 21, the data packet being received from a previous firewall, a previous destination IP address of the data packet identifying the firewall, and a previous source IP address of the data packet identifying the previous firewall.

Clause 26. The system of clause 25, wherein the means for applying the routing rule includes means for replacing the previous destination IP address of the data packet with the translated destination IP address.

Clause 27. The system of clause 21, wherein the data packet is received from a previous firewall, the system further comprising: means for receiving, at the previous firewall, an initial data packet destined to the conflicting private IP address, the initial data packet including a destination IP address identifying the firewall and a source IP address identifying the conflicting private IP address; means for masking, at the previous firewall, the source IP address identifying the conflicting private IP address with an IP address of the previous firewall to generate the data packet; and means for transmitting, at the previous firewall, the data packet to the firewall.

Some implementations may comprise an article of manufacture, which excludes software per se. An article of manufacture may comprise a tangible storage medium to store logic and/or data. Examples of a storage medium may include one or more types of computer-readable storage media capable of storing electronic data, including volatile memory or nonvolatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable types of code, such as source code, compiled code, interpreted code, executable code, static code, dynamic code, and the like. The executable computer program instructions may be implemented according to a predefined computer language, manner, or syntax, for instructing a computer to perform a certain operation segment. The instructions may be implemented using any suitable high-level, low-level, object-oriented, visual, compiled, and/or interpreted programming language.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

What is claimed:

1. A method of routing data traffic for a private network including a first private subnetwork and a second private subnetwork having conflicting private internet protocol (IP) addresses, the method comprising:

receiving, at a firewall, a data packet destined to a conflicting private IP address of the first private subnetwork and the second private subnetwork within the private network, the data packet including a destination IP address identifying the firewall;

evaluating, at the firewall, the data packet to determine whether a source IP address of the data packet satisfies a routing condition corresponding to a routing rule;

applying, at the firewall, the routing rule to determine a translated destination IP address of the first private subnetwork; and sending the data packet to the first private subnetwork.

2. The method of claim 1, further comprising:

updating a log of packet traffic responsive to sending the data packet.

3. The method of claim 1, wherein the firewall is not able to communicate with the second private subnetwork and is not able to route communications to the second private subnetwork.

4. The method of claim 1, wherein the conflicting IP addresses are a same IP address.

5. The method of claim 1, the data packet being received from a previous firewall, a previous destination IP address of the data packet identifying the firewall, and a previous source IP address of the data packet identifying the previous firewall.

6. The method of claim 5, wherein applying the routing rule includes replacing the previous destination IP address of the data packet with the translated destination IP address.

7. The method of claim 1, wherein the data packet is received from a previous firewall, the method further comprising:

receiving, at the previous firewall, an initial data packet destined to the conflicting private IP address, the initial data packet including a destination IP address identifying the firewall and a source IP address identifying the conflicting private IP address;

masking, at the previous firewall, the source IP address identifying the conflicting private IP address with an IP address of the previous firewall to generate the data packet; and transmitting, at the previous firewall, the data packet to the firewall.

8. One or more tangible processor-readable storage media embodied with instructions for executing on one or more processors and circuits of a computing device a process for routing data traffic for a private network including a first private subnetwork and a second private subnetwork having conflicting private internet protocol (IP) addresses, the process comprising:

receiving, at a firewall, a data packet destined to a conflicting private IP address of the first private subnetwork and the second private subnetwork within the private network, the data packet including a destination IP address identifying the firewall;

evaluating, at the firewall, the data packet to determine whether a source IP address of the data packet satisfies a routing condition corresponding to a routing rule;

applying, at the firewall, the routing rule to determine a translated destination IP address of the first private subnetwork; and sending the data packet to the first private subnetwork.

9. The one or more tangible processor-readable storage media of claim 8, the process further comprising:

updating a log of packet traffic responsive to sending the data packet.

10. The one or more tangible processor-readable storage media of claim 8, wherein the firewall is not able to communicate with the second private subnetwork and is not able to route communications to the second private subnetwork.

11. The one or more tangible processor-readable storage media of claim 8, wherein the conflicting IP addresses are a same IP address.

12. The one or more tangible processor-readable storage media of claim 8, the data packet being received from a previous firewall, a previous destination IP address of the data packet identifying the firewall, and a previous source IP address of the data packet identifying the previous firewall.

13. The one or more tangible processor-readable storage media of claim 12, wherein applying the routing rule includes replacing the previous destination IP address of the data packet with the translated destination IP address.

14. The one or more tangible processor-readable storage media of claim 8, wherein the data packet is received from a previous firewall, the process further comprising:

receiving, at the previous firewall, an initial data packet destined to the conflicting private IP address, the initial data packet including a destination IP address identifying the firewall and a source IP address identifying the conflicting private IP address;

masking, at the previous firewall, the source IP address identifying the conflicting private IP address with an IP address of the previous firewall to generate the data packet; and transmitting, at the previous firewall, the data packet to the firewall.

15. A computing system for routing data traffic for a private network including a first private subnetwork and a second private subnetwork having conflicting private internet protocol (IP) addresses, the computing system comprising:

one or more hardware processors;

a communication interface of a firewall executable by the one or more hardware processors and configured to receive a data packet destined to a conflicting private IP address of the first private subnetwork and the second private subnetwork within the private network, the data packet including a destination IP address identifying the computing system;

a routing rules determiner of the firewall executable by the one or more hardware processors and configured to evaluate the data packet to determine whether a source IP address of the data packet satisfies a routing condition corresponding to a routing rule; and a routing rules applicator of the firewall executable by the one or more hardware processors and configured to apply the routing rule to determine a translated destination IP address of the first private subnetwork, wherein the communication interface of the firewall is further configured to send the data packet to the first private subnetwork.

16. The computing system of claim 15, further comprising:

a traffic logger executable by the one or more processors and configured to update a log of packet traffic responsive to sending the data packet.

17. The computing system of claim 15, wherein the communication interface of the firewall is not able to communicate with the second private subnetwork and is not able to route communications to the second private subnetwork.

18. The computing system of claim 15, wherein the conflicting IP addresses are a same IP address.

19

20

19. The computing system of claim 15, the data packet being received from a previous firewall, a previous destination IP address of the data packet identifying the firewall, and a previous source IP address of the data packet identifying the previous firewall.

20. The computing system of claim 19, wherein applying the routing rule includes replacing the previous destination IP address of the data packet with the translated destination IP address.

\* \* \* \* \*